United States Patent [19]

Jachimowicz et al.

[11] Patent Number: 5,703,664
[45] Date of Patent: Dec. 30, 1997

[54] INTEGRATED ELECTRO-OPTIC PACKAGE FOR REFLECTIVE SPATIAL LIGHT MODULATORS

[75] Inventors: Karen E. Jachimowicz, Laveen; George R. Kelly, Gilbert; Michael S. Lebby, Apache Junction, all of Ariz.

[73] Assignee: Motorola, Inc., Schaumburg, Ill.

[21] Appl. No.: 553,737

[22] Filed: Oct. 23, 1995

[51] Int. Cl.⁶ ............................................. G02F 1/1333
[52] U.S. Cl. ....................................................... 349/58
[58] Field of Search ................................. 349/58, 60, 63

[56] References Cited

U.S. PATENT DOCUMENTS

| | | | |
|---|---|---|---|
| 4,440,474 | 4/1984 | Trcka | 350/345 |
| 5,467,215 | 11/1995 | Lebby et al. | 359/247 |
| 5,485,318 | 1/1996 | Lebby et al. | 359/811 |
| 5,486,948 | 1/1996 | Jachimowicz et al. | 359/263 |
| 5,539,554 | 7/1996 | Lebby et al. | 359/83 |
| 5,543,958 | 8/1996 | Lebby et al. | 359/254 |

*Primary Examiner*—William L. Sikes
*Assistant Examiner*—James A. Dudek
*Attorney, Agent, or Firm*—Eugene A. Parsons

[57] ABSTRACT

An array of reflective LCSLM pixels formed on a substrate with a light polarizing layer positioned between the array and a light source. An overmolded housing defining an optical waveguide having a light input, a light output, and a mirrored surface directing light from the input toward the output, the polarizing layer being mounted to allow light passing into the optical waveguide to pass therethrough. The light source provided to direct light through the polarizing layer and evenly illuminate the array. Light reflected from the array is directed onto the mirrored surface of the optical waveguide. A diffuser at the output forms an image plane for the reflected light. Electrical connections are made from the array to a circuit board on which it is mounted. All components are encapsulated by the overmolded housing, having leads formed in the housing to provide external contacts.

24 Claims, 4 Drawing Sheets

INTEGRATED ELECTRO-OPTIC PACKAGE FOR REFLECTIVE SPATIAL LIGHT MODULATORS

FIELD OF THE INVENTION

The present invention pertains to reflective spatial light modulators and more specifically to packaging and illumination of reflective spatial light modulator devices.

BACKGROUND OF THE INVENTION

Liquid crystal spatial light modulators (LCSLMs) are very popular at the present time and are utilized in a great variety of direct view type displays, such as digital watches, telephones, lap-top computers and the like. In general, liquid crystal devices are illuminated with a relatively large, separately mounted light source, preferably from the rear (backlighting), so that most of the light travels directly through the liquid crystal and outwardly to the eye or eyes of a viewer. Direct view displays require a substantial amount of light for suitable viewing, generally about 25 fL to be visible in office environments and more than 100 fL to be visible in an outdoor environment. To provide this amount of light or luminance at the outlets of the LCSLMs requires a relatively bright, and large, light source.

Further, LCSLMs used in display applications require polarized light and a diffuser placed in the optical path. Light entering the LCSLMs must be polarized, and an analyzing polarizer must be placed in the path of exiting light to differentiate between which LCSLM pixels are ON and which are OFF. A diffuse element, either near the modulating LCSLM or as a screen in a projection system, must be used. Generally, the result is to produce a relatively large and cumbersome package, usually with several discrete components.

This problem severely limits the usefulness of liquid crystal displays. For example, in portable electronic devices such as telephones, two-way radios, pagers, etc. the displays are limited to a few alpha-numeric digits. Generally, if a small portable device is desired, the display must be reduced to a very small number of digits, since the size of the display dictates the minimum size of the device into which it is integrated.

One way to alleviate package size problems is to use a very small liquid crystal spatial light modulator (LCSLM) as the image source, with a magnifying optical system. This can take the form of a projection display, in which light modulated by the liquid crystal is projected by the optical system onto a diffusing screen, or it can take the form of a virtual image display, where the optical system creates a large virtual image of the small image created by the LCSLM.

By using the LCSLM in a reflective mode, a reflective LCSLM is formed, which can be built onto a silicon substrate that contains the drive circuitry and other related electronics. When using this configuration as a virtual image display, the number of discrete components still results in a large and cumbersome package. At present, it is extremely difficult to provide a sufficiently large light source, and to mount the light source and the polarizers so that the reflective LCSLM is properly illuminated and can be viewed conveniently.

Thus, it would be beneficial to have reflective LCSLMs with improved packaging and lighting so they would be more versatile.

It is a purpose of the present invention to provide new and improved integrated electro-optic packaging for reflective spatial light modulators.

It is another purpose of the present invention to provide new and improved integrated electro-optic packaging for reflective spatial light modulators utilizing improved light sources.

It is still another purpose of the present invention to provide new and improved integrated electro-optic packaging for reflective spatial light modulators which are useful in forming a virtual image.

It is a further purpose of the present invention to provide new and improved integrated electro-optic packaging for reflective spatial light modulators which is small and compact enough to be utilized in portable electronic equipment.

It is a still further purpose of the present invention to provide new and improved integrated electro-optic packaging for reflective spatial light modulators which requires a sufficiently small amount of power to be utilized in portable electronic equipment.

It is yet another purpose of the present invention to provide new and improved integrated electro-optic packaging for reflective spatial light modulators which includes molded components that are easily and inexpensively fabricated and assembled.

It is a still further purpose of the present invention to provide new and improved integrated electro-optic packaging for reflective spatial light modulators which includes overmolding of an optically clear plastic to aid in positioning, alignment and definition of optical elements.

SUMMARY OF THE INVENTION

The above described problems and others are at least partially solved and the above purposes and others are realized in an integrated electro-optic package for reflective spatial light modulators including an array of reflective spatial light modulator pixels formed on a substrate with each pixel including a control circuit formed in the substrate, each control circuit including control terminals adjacent an outer edge of the substrate, a mirror positioned on the substrate in overlying relationship to the control circuit, and a layer of light modulating material positioned in overlying relationship to the mirror so that light passing through the light modulating material is reflected back through the light modulating material. An overmolded housing, defining an optical waveguide therein, having a light input surface, a light output surface, and a mirrored surface for directing light from the light input surface toward the light output surface is provided. The array of reflective spatial light modulator pixels are mounted opposite the light input surface of the overmolded housing in alignment with light passing therethrough. A light source is provided and positioned to direct light through the light input surface and onto the array of reflective spatial light modulator pixels with the light source spaced from the array of reflective spatial light modulator pixels, so that light from the light source substantially evenly illuminates the array of reflective spatial light modulator pixels. Alternatively, the light source may be mounted in the mirrored surface of the optical waveguide. The array of reflective spatial light modulator pixels is further positioned so that reflected light from the array of reflective spatial light modulator pixels is directed into the light input surface and onto the mirrored surface through the optical waveguide. It is anticipated by this disclosure that a plurality of optical elements, including reflective elements, refractive elements, diffractive elements, polarizers, diffusers, or holographic lens may be mounted in overlying relationship to the light input surface defined by the overmolded housing, specifically positioned on an interior or exterior aspect of the light input surface of the optical waveguide. It is further disclosed that a plurality of optical elements, including reflective elements, refractive elements, diffractive elements or diffusers may be mounted in overlying relationship to the light output surface of the optical waveguide defined by the overmolded housing, specifically positioned on an interior or exterior aspect of the light output surface, to form an image plane for reflected light from the array of reflective spatial light modulator pixels.

The above described problems and others are at least partially solved and the above purposes and others are further realized in a method of fabricating an integrated electro-optic package for reflective spatial light modulators including forming the overmolded housing by some convenient method, such as molding or the like. The housing further includes within a printed circuit board having electrical contacts positioned to connect to the reflective spatial light modulators and leads providing external electrical connections thereto.

BRIEF DESCRIPTION OF THE DRAWINGS

Referring to the drawings.

DESCRIPTION OF THE PREFERRED EMBODIMENTS

Figure 1:
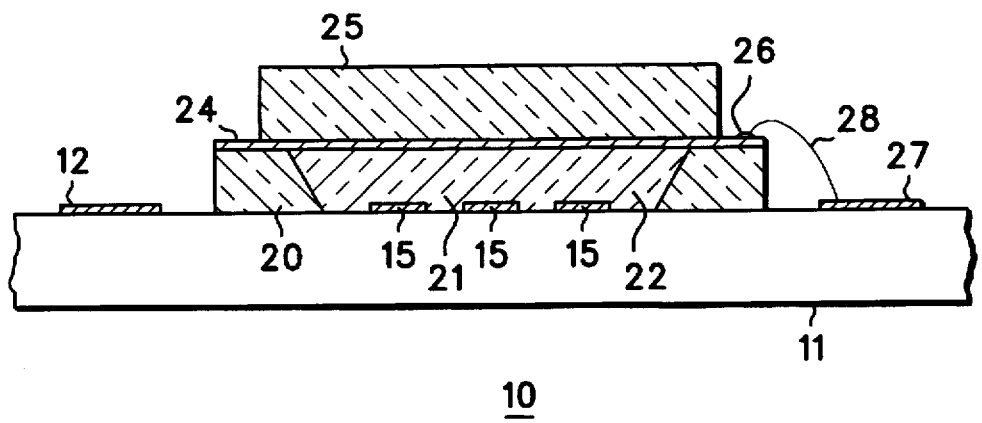
FIG. 1 is a simplified and enlarged sectional view of a reflective liquid crystal spatial light modulator stack.

Referring specifically to FIG. 1, a simplified and enlarged sectional view of a reflective liquid crystal spatial light modulator (LCSLM) stack 10 is illustrated. Stack 10 includes a substrate 11 formed of any convenient semiconductor material, such as silicon, silicon carbide, gallium arsenide, etc. in which integrated electronic circuits can be formed. As will be explained in more detail presently, the integrated electronic circuits include one driver circuit and associated addressing and switching circuitry for each LCSLM pixel formed in stack 10. A plurality of bond or terminal pads 12 are formed adjacent the edges of substrate 11 and are in electrical communication with the integrated electronic circuits so that individual addressing of the electronic circuits is possible.

A two dimensional array of reflective metal pads 15 are formed on the upper surface of substrate 11, which metal pads 15 each define a reflective LCSLM. In the present embodiment, metal pads 15 are made of aluminum or any metal that can be conveniently patterned on the surface of substrate 11 and which will reflect light impinging thereon. Each metal pad of the plurality of metal pads 15 is electrically connected to a driver circuit and addressing and switching circuitry so as to form one contact for activating the liquid crystal material in the space above metal pad 15, forming a pixel.

In this embodiment, metal pads are formed in rows and columns and the addressing and switching circuitry (not shown) includes row and column electrical buses and electronic switches coupled to metal pads 15 so that each metal pad 15 can be individually addressed. The row and column electrical buses are electrically connected to the plurality of bond or terminal pads 12 formed adjacent the edges of substrate 11 for external communication (addressing and controlling) with individual metal pads 15. Further, it should be noted that metal pads 15 along with any driving, addressing and switching circuitry are formed in substrate 11 and coupled to the plurality of bond or terminal pads 12 with pixels defined and formed thereabove.

A generally tubular glass spacer 20 is fixedly attached to the upper surface of substrate 11 by any convenient means, such as adhesive, chemical bonding, growing and etching layers, etc. It will of course be understood that spacer 20 could be formed in a variety of other embodiments and the present structure is illustrated only for purposes of this explanation. Spacer 20 has an inner opening 21 defined therethrough with sufficient size to encircle the two dimensional array of reflective metal pads 15. The cavity formed by opening 21 in spacer 20 in conjunction with the upper surface of substrate 11 is filled with liquid crystal material 22. Typical examples of liquid crystal material which can be used for this purpose are disclosed in U.S. Pat. No. 4,695,650, entitled "Liquid Crystal Compounds and Compositions Containing Same", issued Sep. 22, 1987 and U.S. Pat. No. 4,835,295, entitled "Ferroelectric Liquid Crystal Compounds and Compositions", issued May 30, 1989.

A glass plate 25 has a layer 24 of transparent electrically conductive material, such as indium-tin-oxide (ITO) or the like, formed thereon to define a second contact, which, in conjunction with metal pads 15 and liquid crystal material 22 form a complete two dimensional array of LCSLM pixels. Glass plate 25 is fixedly attached to the upper surface of glass spacer 20 so that electrically conductive material layer 24 on the lower surface thereof is in contact with liquid material 22 and liquid material 22 is contained within the cavity defined by the upper surface of substrate 11, inner opening of spacer 20 and glass plate 25. It will be apparent to those skilled in the art that electrically conductive material layer 24 can be formed in a separate or discrete layer that is simply positioned on glass spacer 20 and partially sandwiched therebetween during assembly.

Electrically conductive material layer 24 is a common second electrical connection for each pixel defined by metal pads 15 and is connected by a conductive lead to a bond pad 26 adjacent the outer edges of glass spacer 20. Bond pad 26 is then electrically connected to a bond pad 27 on substrate 11 by any convenient means, such as wire bond 28, a feed through connector in the edges of glass spacer 20 (not shown), etc. Bond pad 27 is adapted to have applied thereto a common potential, such as ground or some fixed voltage, which in cooperation with various potentials applied to metal pads 15 turn ON, turn OFF, and reset (if necessary) each LCSLM pixel.

It will be understood that various liquid crystal and ferroelectric liquid crystal material can be provided which will operate in different modes in response to different signals or potentials applied thereto. Reflective LCSLMs can be provided, for example, that: rotate the polarization of light impinging thereon when a predetermined potential is applied thereacross and do not rotate the polarization when the potential is removed; rotate the polarization of light impinging thereon when no potential is applied thereacross and do not rotate the polarization when a predetermined potential is applied; rotate the polarization of light impinging thereon when a first predetermined potential is applied thereacross and do not rotate the polarization when a second (lower or higher) potential is applied; etc. Further, common nematic liquid crystal spatial light modulators do not have a memory and do not have to be reset after each application of a potential, but ferroelectric liquid crystal material has a memory and, at least in some applications, ferroelectric liquid crystal spatial light modulators may require a reset (or other modifying) signal between normal switching signals. Generally, the term "activate" or "activating" will be used to indicate that a signal or signals are being applied to or removed from a pixel to cause the pixel to change, regardless of the mode of operation, so as to produce a desired result, which desired result will be apparent.

Glass plate 25 completes reflective LCSLM stack 10 which includes a two dimensional array of reflective liquid crystal pixel elements, each of which are individually addressable through bond pads 12. To turn a pixel ON a potential must be applied between the upper and lower contacts for that specific pixel. With no potential applied, the pixel is normally in an OFF condition. Glass plate 25 defines a light input and light output for each of the pixels in the two dimensional array of reflective LCSLMs. While the present embodiment is explained using liquid crystal material in the pixels, it should be understood that other types of spatial light modulators might be utilized in the pixels, including, for example, other types of light modulating liquid or solid material, mirrors or other reflective material, etc.

Figure 2:
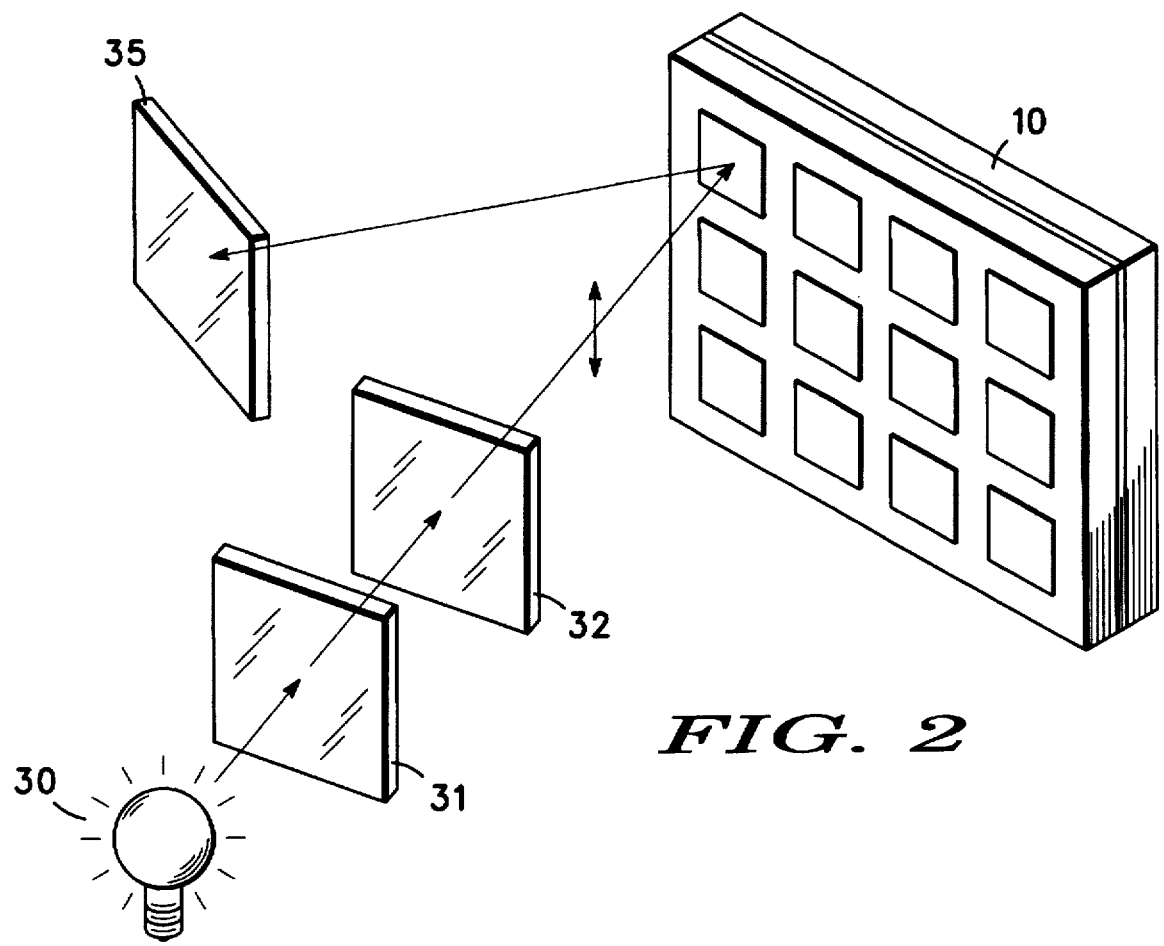
FIG. 2 is a semi-schematic perspective view for illustrating the operation of the reflective liquid crystal spatial light modulator stack.

Referring now to FIG. 2, the operation of reflective LCSLM stack 10 is briefly explained. A light source 30 is provided, which may be any light emitting device capable of providing sufficient light for the operation explained. Light from source 30 is diffused in a plate 31 and polarized in a second plate 32 before illuminating stack 10. Diffusing plate 31 is provided to spread the light from source 30 over stack 10. Polarizing plate 32 polarizes the light into a vertical polarization, for example, prior to the light impinging on stack 10.

The liquid crystal, for example ferroelectric liquid crystal material, in stack 10 rotates the polarization of light passing therethrough when in the activated condition (this operating mode is used only for purposes of this explanation), just as in a standard twisted nematic liquid crystal display. Thus, light passing through glass plate 25 and liquid crystal material 22 and reflected from pads 15 back through liquid crystal material 22 and glass plate 25 gets a 90° polarization rotation in each pixel that is activated. For all pixels in the array that are not activated the light passing therethrough is not changed in polarization.

An analyzing polarization plate 35 is positioned so that light reflected through the plurality of pixels in the array of stack 10 passes therethrough. If, for example, plate 35 is polarized horizontally all light reflected from pixels that are activated, which light is rotated 90° in polarization, will pass through plate 35, while light reflected from pixels which are not activated and which is not rotated in polarization will be blocked. If plate 35 is vertically polarized, the same as plate 32, light from pixels which are not activated will pass therethrough and light from pixels which are activated will be blocked. It will be understood that pixels which are constructed to operate in any other mode, such as those described above, may require different orientation of plates 32 and 35.

Figure 3:
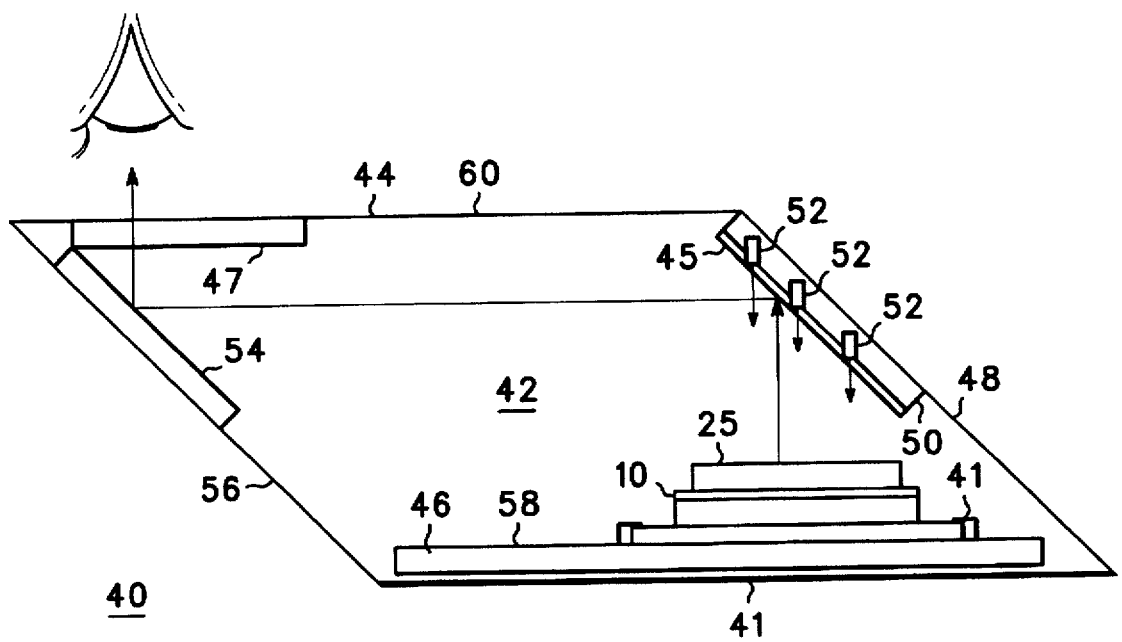
FIG. 3 is a sectional view of an integrated electro-optic package, including a reflective liquid crystal spatial light modulator stack, embodying the present invention.

Referring specifically to FIG. 3, a simplified sectional view of an integrated electro-optical package 40 is illustrated. Package 40 includes reflective LCSLM stack 10, which is illustrated in an even more simplified form for convenience. In this embodiment, package 40 is comprised of an overmolded housing 44, defining an optical waveguide 42 having a generally parallelogram-shaped cross-section. Optical waveguide 42 being defined by angled sides 48 and 56 and sides 41 and 60 of overmolded housing 44. Housing 44 is formed of an optically clear material, such as plastic, and in this preferred embodiment is molded by some convenient process, such as injection or thermal set molding. For example, housing 44 is molded using any convenient optically clear plastic, such as optically clear liquid epoxy available under a Tradename EPO-TEK 301-2 from EPOXY TECHNOLOGY INC. or a clear epoxy molding compound available under the Tradename HYSOL MG18 from Dexter Corporation. Overmolded housing 44 is formed of plastic with a relatively low coefficient of expansion (e.g. 20 ppm or less) so that housing 44, substrate 11, glass spacer 20 and glass plate 25 (as illustrated in FIG. 1) all have temperature coefficients of expansion within a range that allows reasonable temperature cycling of the structure without causing critical or damaging stresses.

Positioned and supported within a lower aspect of overmolded housing 44 is a printed circuit board 46, formed with a plurality of leads (not shown) affixed to, or embedded in, a lower aspect of overmolded housing 44. Generally, housing 44 is molded of plastic or the like having flexible leadframes embedded therein during the molding operation and in electrical cooperation with printed circuit board 46.

It should be understood that optical waveguide 42, defined by housing 44, is formed of optically clear plastic and printed circuit board 46 is integrated (physically and electrically) with the optical waveguide during the molding process.

In this specific embodiment, a reflective liquid crystal spatial light modulator (LCSLM) stack 10 is electrically connected to and supported by an upper surface 58 of printed circuit board 46. Stack 10 has formed a plurality of generally L-shaped mounting pins 41 so as to electrically engage bond pads 12 and 27 of substrate 11 (shown in FIG. 1) at one end thereof and so that the other end forms an electrical connection to printed circuit board 46. This provides an electrical connection between control circuitry on printed circuit board 46, and driver circuits and switching address circuitry formed in stack 10. Stack 10 can be mounted on printed circuit board 46 by simply plugging mounting pins 41 into matching receptacles or other convenient means such as bump bonding, wire bonds, etc.

In the preferred embodiment, a light polarizing plate 45 is positioned within optical waveguide 42 of housing 44 between an angled side 48 of housing 44 and glass plate 25, in overlying relationship to the array of spatial light modulator pixels, so that all light entering or exiting glass plate 25 passes through and is polarized by polarizing plate 45. It will of course be understood that polarizing plate 45 can be deposited on the surface of glass plate 25 or in an alternative embodiment, positioned exterior overmolded housing 44 of electro-optic package 40, within a defined path of illumination to stack 10.

In the preferred embodiment, one or more light sources 52 are positioned on angled side 48 of housing 44, opposite and directed toward stack 10. Angled side 48 also has a reflective surface, such as a mirror 50, positioned on a surface thereon. Light sources 52 can be mounted by embedding them in housing 44 during molding, by forming holes in housing 44 and positioning light sources 52 therein, by forming mirror 50 and light sources 52 as a single unit which is positioned in an overlying relationship to an interior or exterior aspect of angled side 48, of overmolded housing 44 or by forming at least portions of mirror 50 as a two way mirror. An opposed angled side 56 of overmolded housing 44 has a reflective surface, such as a mirror 54, positioned on an interior surface. Light from light sources 52 passes through mirror 50, and is reflected back to mirror 50 from stack 10 toward mirror 54 on opposed angled side 56 of overmolded housing 44.

Light source or sources 52 can include, for example, a single light emitting diode or several light emitting diodes (as illustrated in FIG. 3) positioned so as to substantially uniformly illuminate stack 10. For example, currently known GaN LEDs are capable of producing output power of approximately 2 mW at 40 mA, which translates into an output power of approximately 11 lumens/watt.

In another example, three LEDs (a red, a green and a blue LED) are provided on surface 48 and are alternately activated to form three different light sources 52, each of which fully and uniformly illuminates stack 10 at different times. By activating each LCSLM (pixel) in stack 10 in accordance with the amount of each color (red, green, or blue) required in each pixel during the time that that color LED is activated, a complete and full color image is produced for each cycle of the three LEDs. It will of course be understood that more than one LED of each color can be utilized if more than one is required to provide full and uniform illumination.

In this specific embodiment, light sources 52 are embedded in mirror 50 integrally formed in optically clear overmolded housing 44 during the molding process and a patterned transparent conductive layer, patterned electrical leads, or imbedded electrical leads (not shown) are provided on an upper surface of mirror 50 to provide electrical connections to light sources 52. It is understood that alternative sources of light may be utilized, positioned exterior overmolded housing 44.

Side 60 is formed to receive an optical element, such as a diffuser, reflective element, refractive element, polarizing plate or other similar type of optical element. In the preferred embodiment, there is positioned a diffuser 47 which forms an image plane for light reflected from stack 10. Additional optical elements may be incorporated into mirrors 50 and 54, or between mirrors 50 and 54, and/or attached to the outer surface of diffuser 47 (or housing 44 in overlying engagement with diffuser 47). In addition, there may be positioned additional optical elements (not shown) between stack 10 and angled side 48, especially if the distance between diffuser 47 and stack 10 is great enough to allow too much spreading of the reflected light. Such additional optical elements can provide additional magnification and/or partial collimation prior to the light impinging upon diffuser 47. These additional elements can be formed into overmolded housing 44, leaving airgaps which can either be left as airgaps or filled with optical material with a different index of refraction from housing 44 or positioned on an exterior aspect of overmolded housing 44.

Generally, diffuser 47 is formed as an optical lens which is mounted on an interior surface of housing 44, thereby completely encapsulated by housing 44. In the alternative, diffuser 47 can be integrally formed into housing 44 or removeably and/or adjustably mounted on an exterior surface of housing 44. It should be understood that the diffusion required to produce a real image from the light reflected by the array of LCSLMs can be provided by a diffusion element (not shown) positioned between polarizing plate 45 and light source 52 or, in some applications, by a diffusion material positioned on the surfaces of metal plates 15 (in stack 10), or some combination of the above.

Stack 10 is oriented so that light reflected thereby is directed upwardly into optical waveguide 42, defined by housing 44 toward angled side 48 thereof. Optical elements 50 and 54 direct or guide the light within optical waveguide 42 toward diffusion lens 47. In the preferred embodiment, optical waveguide 42 is formed into a single optical waveguide for convenience. Housing 44, defining optical waveguide 42 is formed to encapsulate stack 10, printed circuit board 46 and optical elements 47, 50 and 54 and any additionally required optical elements as previously disclosed. A plurality of external leads are molded into housing 44 so as to extend into optical waveguide 42 and electrically engage printed circuit board 46 and to extend outwardly beyond the outer surface of housing 44 and form mounting and/or external electrical connections for integrated electro-optic package 40.

Thus, a new and improved integrated electro-optic package for reflective LCSLMs is disclosed which is relatively easy and inexpensive to manufacture and having component parts encapsulated therein. The package ruggedly mounts the various optical components while conveniently integrating electrical connections to the components and providing external connections thereto. Light sources, polarizers, diffusers and, if desired, additional optics are conveniently integrated into a small compact package which is easily integrated into portable electronic equipment. It is further disclosed that additional optical elements, such as polarizer plates or layers, refractive elements, diffractive elements, etc. may be easily positioned exterior the electro-optic package 40. By using LEDs for the light source, being integrally formed with overmolded housing 44, or mounted in either an interior or exterior position to overmolded housing 44, the size of the package is further reduced and the electrical power required is also minimized. Also, by using multicolored LEDs, images with partial or full color can be formed.

Figure 4:
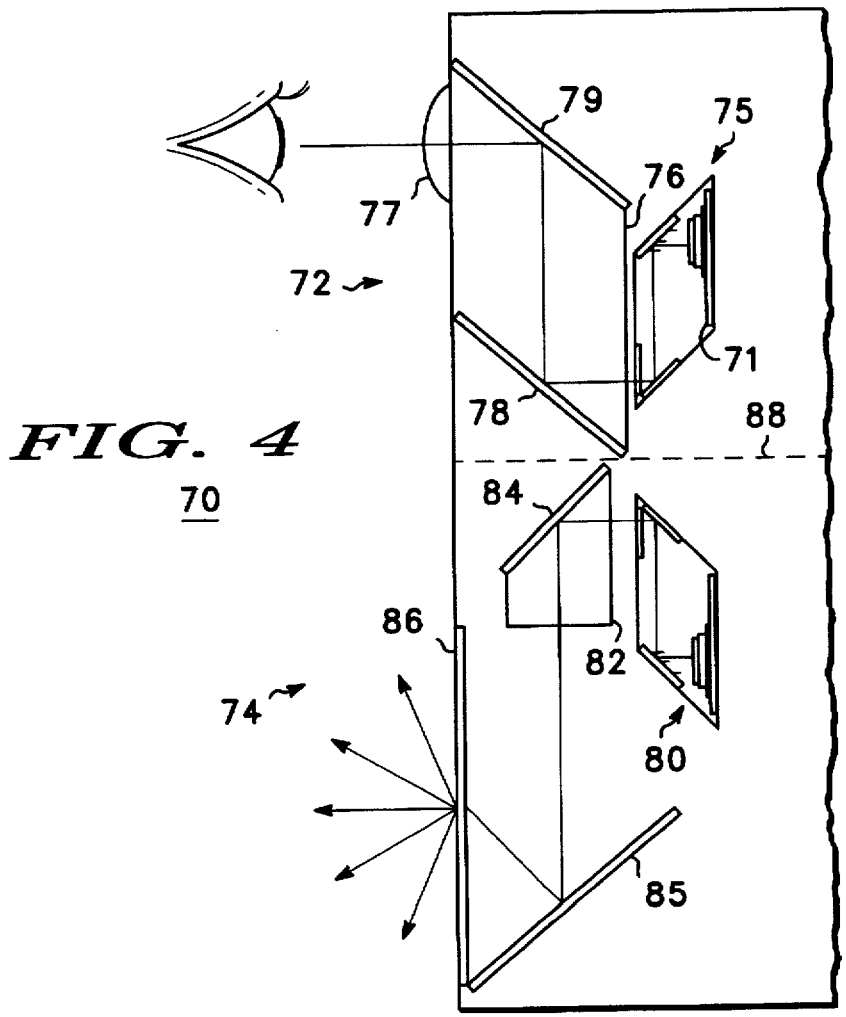
FIG. 4 is a simplified schematic view generally illustrating dual image manifestation apparatus utilizing the integrated electro-optic package illustrated in FIG. 3.

Referring specifically to FIG. 4 shown is a portable electronic device, incorporating therein, two different possible applications for integrated electro-optic package 40 of FIG. 3, including a dual image manifestation apparatus 70 constructed in accordance with the present invention. Dual image manifestation apparatus 70 includes first image manifestation apparatus 72 constructed to provide a large virtual image and second image manifestation apparatus 74 constructed to provide a direct view image. It is understood that dual image manifestation apparatus 70 is shown as one possible application, alternative applications are anticipated, i.e. a single image manifestation apparatus.

Apparatus 72 includes a real image generator 75, generally similar to integrated electro-optical package 40 illustrated in FIG. 3, affixed in overlying relationship to an optical input of an optical waveguide 76. An optical output of optical waveguide 76 is positioned to be externally available and has a lens system, represented by a single lens 77, affixed thereover.

Image generator 75 includes, for example, integrated electro-optic package 40 (as illustrated in FIG. 3) mounted on a circuit board 71 and driven by data processing circuits (not shown), also mounted on circuit board 71. The data processing circuits include for example, logic and switching circuit arrays for controlling each pixel in the SLM array of image generator 75. The data processing circuits may include, in addition to or instead of the logic and switching arrays, a microprocessor or similar circuitry for processing input signals to produce a desired real image on the diffuser of image generator 75.

In this specific embodiment the pixels are formed in a regular, addressable pattern of rows and columns and, by addressing specific pixels by row and column in a well known manner, the specific pixels are activated to produce a real image on the diffuser. Digital or analog data is received at an input terminal and converted by data processing circuits into signals capable of activating selected LCDs to generate the predetermined real image.

Optical waveguide 76 includes one or more optical elements 78 and 79, which may be Fresnel lenses, reflective elements, refractive elements, diffractive elements, etc. Elements 78 and 79 provide some magnification and may reduce various types of distortion. Lens system 77 is mounted so as to receive the image from optical waveguide 76, magnify it an additional predetermined amount and create the aperture within which a virtual image is viewed. In the present embodiment, optical waveguide 76 and lens system 77 magnify the image a total of approximately twenty times. Generally, a magnification greater than ten (10x) is required to magnify the real image generated by integrated electro-optical package 40 sufficiently to be perceived by a human eye.

It will of course be understood that lens system 77 may be adjustable for focus and additional magnification, if desired, or may be fixed in a housing for simplicity. Because the image received by lens system 77 from optical waveguide 76 is much larger than the image at image generator 75, lens system 77 may not be required to provide the entire magnification and, therefore, is constructed larger and with less magnification. Because of this larger size, the lens system has a larger field of view and a greater working distance, which in turn provides better eye relief.

Here it should be understood that the virtual image viewed by the operator through lens system 77 is relatively large (e.g. 8.5"×11") and appears to the operator to be several feet behind dual image manifestation apparatus 70. Because of the size of the virtual image produced by image manifestation apparatus 72, a large variety of alpha-numeric and/or graphic images can be easily and conveniently viewed. Further, image manifestation apparatus 72 is very small and compact so that it can easily be incorporated into portable electronic devices, such as pagers, two-way radios, cellular telephones, data banks, etc., without substantially effecting the size or power requirements.

Second image manifestation apparatus 74, constructed to provide a direct view image includes an image generator 80, which includes integrated electro-optic package 40 (as illustrated in FIG. 3) similar to image generator 75, an optical waveguide 82, and optical elements 84 and 85, and a direct view screen 86. Optical waveguide 82 may image the output of image generator 80 onto screen 86. Image generator 80 is mounted in overlying relationship on an optical input to optical waveguide 82. The image from image generator 80 is reflected and/or otherwise directed by an optical element 84 onto optical element 85. While element 85 is illustrated as a separate element, it will be understood that it could be incorporated as a portion of optical waveguide 82. Optical element 85 can also include a Fresnel lens, or the like, for focusing and/or magnification if desired. The image from optical element 85 is directed onto screen 86 where it can be directly viewed by the operator.

Image manifestation apparatus 74 provides a direct view image which can be no larger than screen 86 upon which it is projected. Because of the much smaller size of the direct view image, the amount of magnification required is much smaller, i.e. less than approximately 10x. Generally, while the direct view image is much smaller than the virtual image produced by image manifestation apparatus 72, more power is required to generate the direct view image because more light is required to project the image onto screen 86. However, because the direct view image on screen 86 is smaller, any message contained in the direct view image must be larger in order to be perceived by the operator. Thus, whereas one pixel, or spatial light modulator, in the array of image generator 71 produces one pixel in the final virtual image (for example), several pixels, or spatial light modulators, in the array of image generator 80 may operate in conjunction to produce one pixel in the direct view image on screen 86. Because several pixels produce one pixel, in many instances the higher light requirement may be automatically resolved. If additional light is required in some applications, additional LEDs (described above) or higher current and correspondingly higher light output may be utilized as the light sources, as one example.

It is understood for purposes of this example, that a dual image manifestation apparatus is utilized for convenient viewing by the operator. In use, video from a receiver or other data source within the portable electronic device is communicated to image manifestation apparatus 72. Control signal titles, etc. may appear in a direct view image on screen 86, while larger alpha-numeric messages and graphics will appear in the virtual image at lens system 77. It is anticipated by this disclosure to include means so that image manifestation apparatus 72 can be physically separated from image manifestation apparatus 74 along line 88 (as illustrated in FIG. 4) for example, and each can be used separately. In such an embodiment, image manifestation apparatus 72 is a very low power device while image manifestation apparatus 74 generally requires more power and will, for example, generally contain the portable electronic equipment (e.g. a communication receiver).

Figure 5:
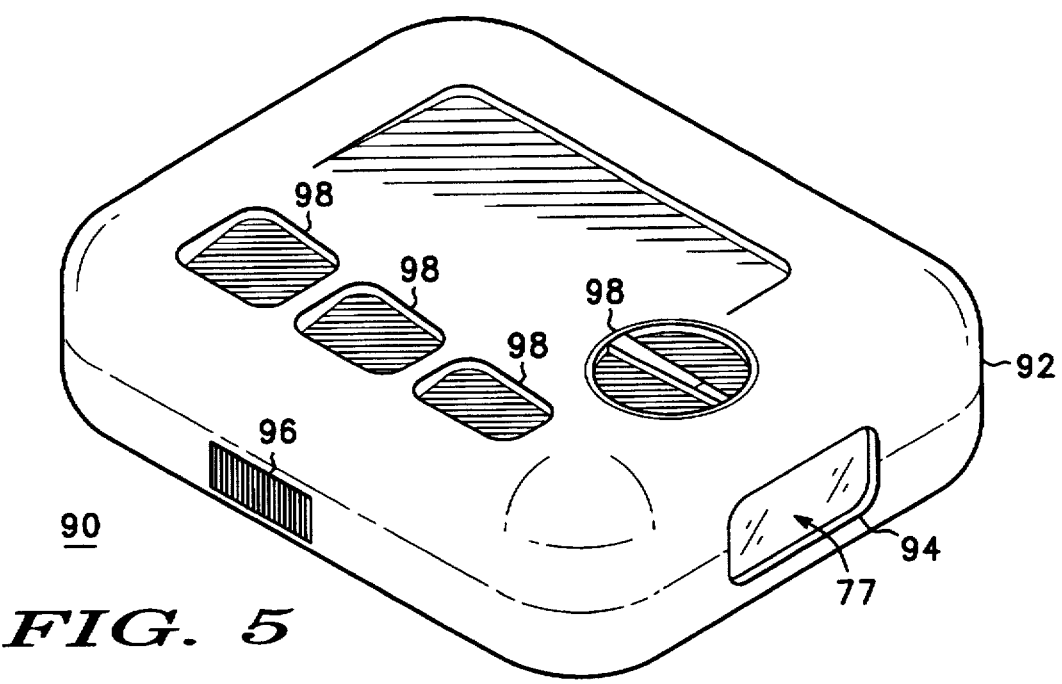
FIG. 5 is a perspective of a preferred embodiment of the present invention.

Referring specifically to FIG. 5, a perspective view of a single virtual image manifestation apparatus in a portable electronic device 90 is illustrated in a typical housing 92. An aperture 94 is provided on a surface of housing 92 to receive lens system 77 so that the virtual image produced by the image manifestation apparatus may be readily viewed. A touch pad or button 96 is optionally provided on a surface of housing 92 for controlling a cursor in the virtual image, which cursor may further control displayed keyboards and/or other controls. In addition, alternative means for controlling the cursor are anticipated by this disclosure, including the use of motion sensors to detect tip/tilt/up/down/right/left movement of the device and corresponding movement of the cursor image. Additional, a plurality of controls 98 are provided on the surface of housing 92 and generally include such features as an on/off switch, image selection control switch, and controls for any electronic devices connected thereto.

Figure 6:
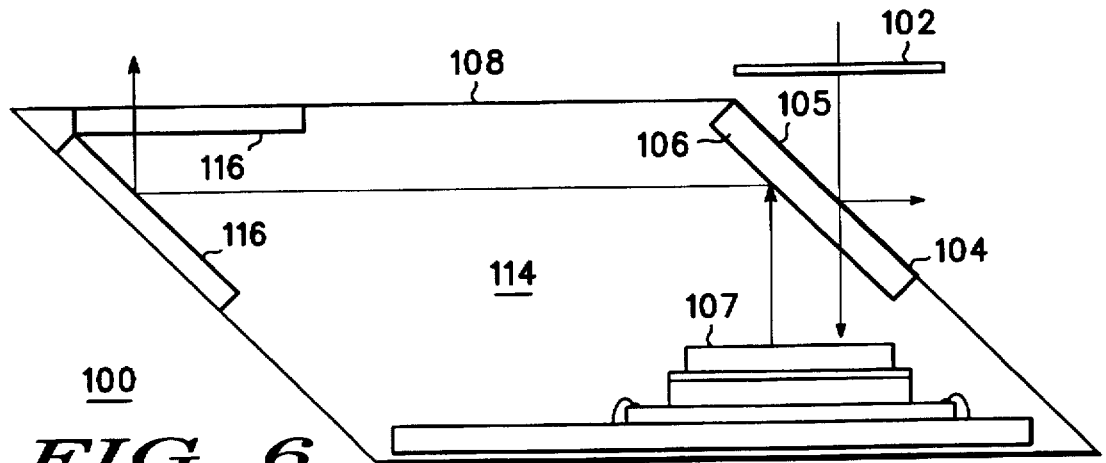
FIGS. 6 and 7 illustrate simplified schematic views of alternative light sources and optical elements for an integrated electro-optic package, including a reflective liquid crystal spatial light modulator stack, embodying the present invention.
Figure 7:
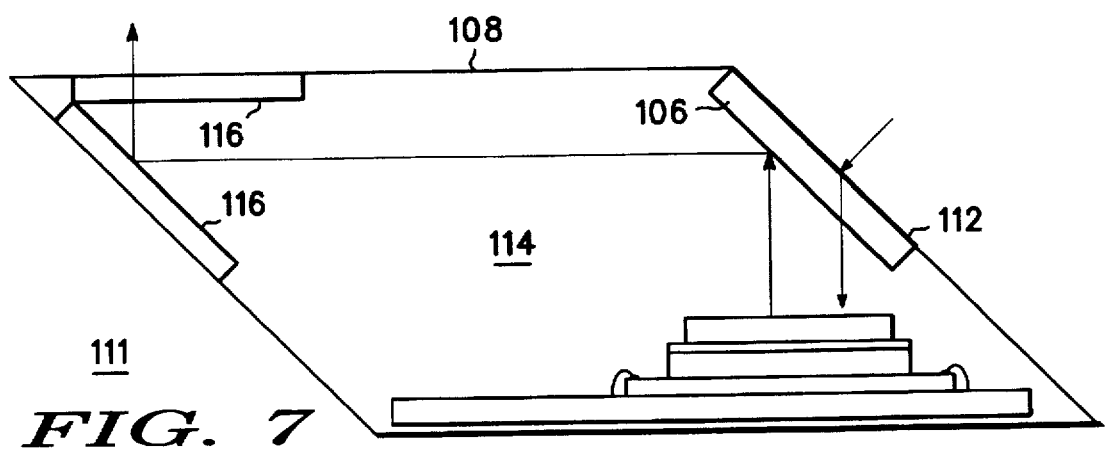

Referring now to FIGS. 6 and 7, there are illustrated two simplified schematic views generally illustrating alternative embodiments of the present invention utilizing various light sources and optical elements, including a reflective liquid crystal spatial light modulator stack. Shown in FIG. 6 is an example of an electro-optic package 40 (see FIG. 3) of the present invention, designated 100 herein, having an overmolded housing 108, encapsulating therein a plurality of optical elements 116, a reflective spatial light modulator stack 107 and defining an optical waveguide 114. Illustrated is the positioning of a polarizing plate 102 exterior the package 100. It is further illustrated to include a polarizing beamsplitter coating 104 on a light input surface 105 of housing 108 or on an upper surface of a reflective optical element 106, thereby encapsulated by housing 108.

Shown in FIG. 7 is an example of an electro-optic package 40 (see FIG. 3) of the present invention, designated 111 herein. Illustrated is the positioning of an angle sensitive reflection/transmission hologram 112 on light input surface 110 of reflective optical element 106, thereby encapsulated by housing 108. In the alternative, reflection/transmission hologram 112 may be positioned on an interior or exterior aspect of light input surface 110 of housing 108. In addition, as shown in FIGS. 6 and 7, there are provided additional optical elements 116 within optical waveguide 114, encapsulated by housing 108.

Figure 8:
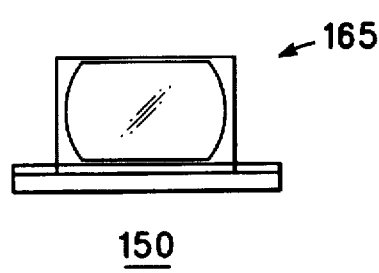
FIGS. 8, 9 and 10 illustrate a front view, side elevational view, and top plan view, respectively, of an image manifestation apparatus utilizing the integrated electro-optic package illustrated in FIG. 3.
Figure 9:
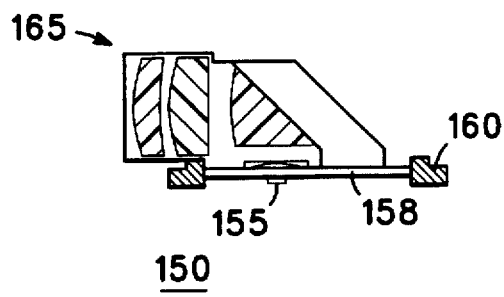
Figure 10:
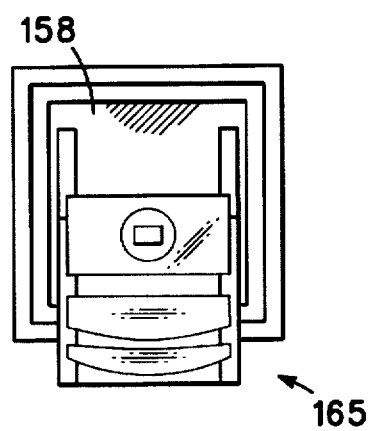

FIGS. 8, 9 and 10 illustrate another miniature virtual image display 150 in accordance with the present invention, as illustrated in a front view, side elevational view, and top plan, respectively. FIGS. 8, 9 and 10 illustrate miniature virtual image display 150 approximately the actual size to provide an indication as to the extent of the reduction in size achieved by the present invention. Display 150 includes an integrated electro-optic package 155 (generally similar to package 40). In a preferred embodiment, integrated electro-optic package 155 produces a luminance less than approximately 15 fL. This very low luminance is possible because display 150 produces a virtual image. Further, because a very low luminance is required, LEDs and the like may be utilized as the light source for the SLM stack, which greatly reduces the size and power requirements. Integrated electro-optic package 155 is mounted on the surface of a driver board 158. An optical system 165 is also mounted on driver board 158 and magnifies the image approximately 20x to produce a virtual image approximately the size of an 8.5× "×11" sheet of paper.

Here it should be noted that because integrated electro-optic package 155 is very small and the fact that a virtual image is utilized, rather than a direct view display, the overall physical dimensions of miniature virtual image display 150 are approximately 1.5 inches (3.8 cm) wide by 0.75 inches (1.8 cm) high by 1.75 inches (4.6 cm) deep, or a total volume of approximately 2 cubic inches (32 cm³).

Figure 11:
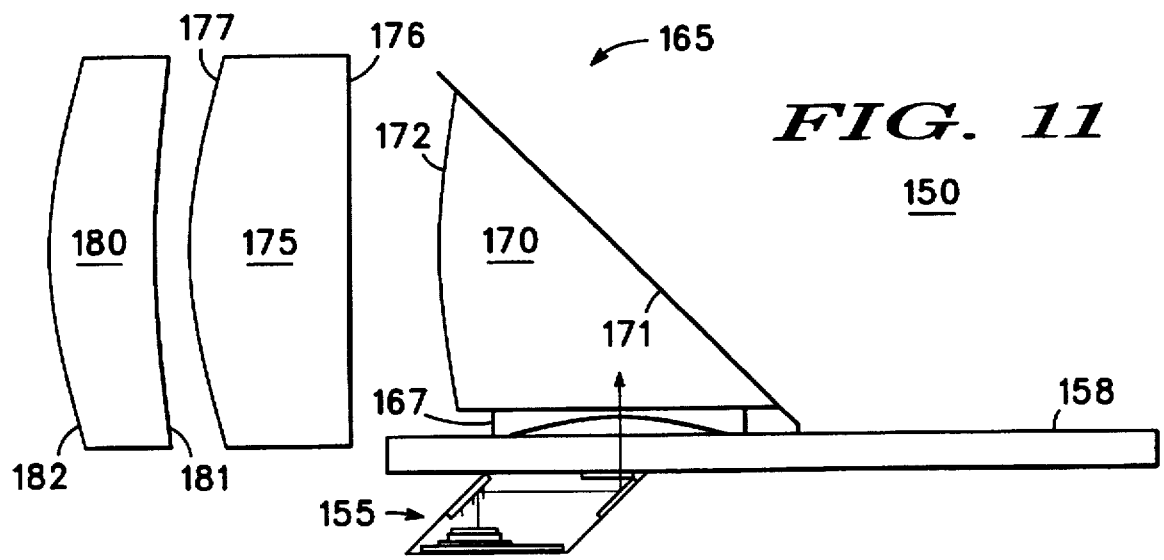
FIG. 11 is a 4x magnified view in side elevation of the apparatus of FIG. 9.

Referring specifically to FIG. 11, a 4x magnified view in side elevation of miniature virtual image display 150 of FIG. 9 is illustrated for clarity. From this view it can be seen that a first optical lens 167 is affixed to receive the image from light output surface formed by the overmolded housing of electro-optic package 155. An optical prism 170 is mounted to reflect the image from a surface 171 and from there through a refractive surface 172. The image is then directed to an optical lens 175 having a refractive inlet surface 176 and a refractive outlet surface 177. From lens 175 the image is directed to an optical lens 180 having an inlet refractive surface 181 and an outlet refractive surface 182. Also, in this embodiment at least one diffractive optical element is provided on one of the surfaces, e.g. surface 171 and/or surface 176, to correct for aberration and the like. The operator looks into surface 182 of lens 180 and sees a large, easily discernible virtual image which appears to be behind display 150.

It should be noted that in the prior art, pagers and other small receivers in which visual displays are desired, are especially handicapped by the size of the displays. Generally such displays are limited to a single short line of text or several digits, and the size of the display still dictates the size of the receiver. Utilizing an embodiment of the present invention, a display with several lines of text to a full page can be incorporated and the size of the receiver or other portable electronic equipment can be substantially reduced. Further, the display is clearer and easier to read and, because it utilizes a virtual image display, requires very little power for the operation thereof. In fact, the present display uses much less power than any of the direct view displays normally utilized in electronic equipment and, as a result, can be fabricated in much smaller sizes.

Thus a greatly improved portable electronic device with miniature virtual image display is disclosed, which incorporates an extremely small spatial light modulator array on a semiconductor chip. Because a virtual image display is utilized, the display is constructed very small and requires very little power. Further, because of the extremely small size and power consumption of the virtual image display, it is incorporated into portable electronic equipment without substantially effecting the size or power requirements. The miniature virtual image display provides a predetermined amount of magnification along with sufficient eye relief and lens working distance to create a comfortable and viewable virtual image. Also, a complete virtual image is produced with no moving parts or power consuming motors and the like. Further, the electronics provided as a portion of the miniature virtual image display allows a variety of very small real images to be generated, e.g. alpha-numeric and/or graphic. The very small image is magnified into a large virtual image that is easily perceived by the operator.

While we have shown and described specific embodiments of the present invention, further modifications and improvements will occur to those skilled in the art. We desire it to be understood, therefore, that this invention is not limited to the particular forms shown and we intend in the appended claims to cover all modifications that do not depart from the spirit and scope of this invention.

What is claimed is:

1. An integrated electro-optic package for reflective spatial light modulators comprising:

an array of reflective spatial light modulator pixels formed on a substrate with each pixel including a control circuit formed in the substrate, each control circuit including control terminals adjacent an outer edge of the substrate, a mirror positioned on the substrate in overlying relationship to the control circuit, and spatial light modulator material positioned in overlying relationship to the mirror so that light passing through the spatial light modulator material is reflected back through the spatial light modulator material;

an overmolded housing, defining an optical waveguide having a light output surface, and a plurality of mirrored surfaces for directing light from the array toward the light output surface, the array of reflective spatial light modulator pixels being mounted within the overmolded housing, the overmolded housing thereby encapsulating the array of spatial light modulator pixels formed on a substrate;

a light source positioned to direct light through a polarizing layer, positioned between the light source and the array of reflective spatial light modulator pixels, and onto the array of reflective spatial light modulator pixels, with the light source spaced from the array of reflective spatial light modulator pixels, so that light from the light source substantially evenly illuminates the array of reflective spatial light modulator pixels, the array of reflective spatial light modulator pixels being positioned so that reflected light from the array of reflective spatial light modulator pixels is directed onto the mirrored surfaces and through the optical waveguide;

a diffuser mounted on at least one of an interior aspect or an exterior aspect of the light output surface of the optical waveguide to form an image plane for reflected light from the array of reflective spatial light modulator pixels; and a printed circuit board positioned within a lower portion of the optical waveguide defined by the overmolded housing, in electrical contact with said array of reflective spatial light modulator pixels formed on said substrate, and thereby providing support for the substrate.

2. An integrated electro-optic package for reflective spatial light modulators as claimed in claim 1 wherein the overmolded housing is optically clear plastic.

3. An integrated electro-optic package for reflective spatial light modulators as claimed in claim 2 wherein the optically clear plastic has a temperature coefficient of expansion that is substantially similar to the array of reflective spatial light modulator pixels temperature coefficient of expansion.

4. An integrated electro-optic package for reflective spatial light modulators as claimed in claim 1 wherein the overmolded housing is molded optically clear plastic.

5. An integrated electro-optic package for reflective spatial light modulators as claimed in claim 1 wherein the light source includes a light emitting diode.

6. An integrated electro-optic package for reflective spatial light modulators as claimed in claim 5 wherein the light source includes at least two light emitting diodes, each of which emit a different color of light.

7. An integrated electro-optic package for reflective spatial light modulators as claimed in claim 1 wherein the overmolded housing is comprised of a molded optically clear plastic and the light source is a plurality of light emitting diodes embedded in the optically clear plastic.

8. An integrated electro-optic package for reflective spatial light modulators as claimed in claim 1 wherein the array of reflective spatial light modulator pixels, and the layer of spatial light modulator material is a continuous layer across the entire array and each control circuit for each pixel formed in the substrate includes one contact, the array further including an optically clear contact positioned on an opposite side of the continuous layer with the one contact and the optically clear contact defining a pixel within the continuous layer.

9. An integrated electro-optic package for reflective spatial light modulators as claimed in claim 8 wherein the spatial light modulator material includes liquid crystal material.

10. An integrated electro-optic package for reflective spatial light modulators as claimed in claim 8 wherein the liquid crystal material includes ferroelectric liquid crystal material.

11. An integrated electro-optic package for reflective spatial light modulators as claimed in claim 8 wherein the optically clear contact for each pixel is formed in a layer of indium-tin-oxide deposited in overlying relationship to the continuous layer of spatial light modulator material.

12. An integrated electro-optic package for reflective spatial light modulators as claimed in claim 8 wherein the mirror positioned on the substrate is a polished pad of metal, one for each pixel, which pad of metal also forms the one contact included in the control circuit.

13. An integrated electro-optic package for reflective spatial light modulators as claimed in claim 10 wherein the polished pad of metal for each pixel is a polished pad of aluminum.

14. An integrated electro-optic package for reflective spatial light modulators as claimed in claim 1 further comprising contacts formed in the printed circuit board so as to be in electrical communication with the control terminals adjacent an outer edge of the substrate of each control circuit and further having a plurality of leads extending to an external portion of the housing to form external contacts for the control circuits.

15. An integrated electro-optic package for reflective liquid crystal spatial light modulators comprising:

a reflective liquid crystal spatial light modulator stack including a substrate with a plurality of control circuits formed therein, each control circuit including control terminals adjacent an outer edge of the substrate and an electrical contact mirror positioned on the substrate, each electrical contact mirror defining a pixel and a first electrical contact for the pixel, a layer of liquid crystal spatial light modulator material positioned in overlying relationship to the electrical contact mirrors so that light passing through the liquid crystal spatial light modulator material is reflected back through the liquid crystal spatial light modulator material, and an electrically conductive optically transparent layer of material positioned on an opposite surface of the liquid crystal spatial light modulator material to form a second electrical contact for each pixel;

a light polarizing layer positioned in overlying relationship to the reflective liquid crystal spatial light modulator stack;

an overmolded housing comprised of an optically clear plastic, defining an optical waveguide, the optical waveguide having a light output surface, and a plurality of mirrored surfaces for directing light from the reflective liquid crystal spatial light modulator stack toward the light output surface, the reflective liquid crystal spatial light modulator stack being mounted within the overmolded housing;

a light source positioned to direct light onto the reflective spatial light modulator stack, the light source spaced from the reflective liquid crystal spatial light modulator stack, so that light from the light source substantially evenly illuminates the reflective liquid crystal spatial light modulator stack, the reflective liquid crystal spatial light modulator stack being positioned so that reflected light from the reflective liquid crystal spatial light modulator stack is directed onto the mirrored surface through the optical waveguide; and a diffuser mounted in overlying relationship to the light output surface of the optical waveguide to form an image plane for reflected light from the reflective liquid crystal spatial light modulator stack.

16. An integrated electro-optic package for reflective liquid crystal spatial light modulators as claimed in claim 15 wherein the layer of liquid crystal spatial light modulator material is contained within a closed cavity having internal opposed flat surfaces, the electrical contact mirrors are affixed to one of the internal surfaces and the electrically conductive optically transparent layer is affixed to the other of the internal surfaces.

17. An integrated electro-optic package for reflective liquid crystal spatial light modulators as claimed in claim 16 wherein the closed cavity is defined by a surface of the substrate, a spacer affixed to the surface of the substrate and a glass plate affixed over the spacer.

18. An integrated electro-optic package for reflective liquid crystal spatial light modulators as claimed in claim 16 wherein the light source is mounted in at least one of the plurality of mirrored surfaces of the optical waveguide and positioned to direct light through the polarizing layer and onto the reflective liquid crystal spatial light modulator stack.

19. An integrated electro-optic package for reflective liquid crystal spatial light modulators comprising:

a reflective liquid crystal spatial light modulator stack including a substrate with a plurality of control circuits formed therein, each control circuit including control terminals adjacent an outer edge of the substrate and an electrical contact mirror positioned on the substrate, each electrical contact mirror defining a pixel and a first electrical contact for the pixel, a layer of liquid crystal spatial light modulator material positioned in overlying relationship to the electrical contact mirrors so that light passing through the liquid crystal spatial light modulator material is reflected back through the liquid crystal spatial light modulator material, an electrically conductive optically transparent layer of material positioned on an opposite surface of the liquid crystal spatial light modulator material to form a second electrical contact for each pixel, and the layer of liquid crystal spatial light modulator material being contained within a closed cavity having internal opposed flat surfaces and defined by a surface of the substrate, a spacer affixed to the surface of the substrate and a glass plate affixed over the spacer with the electrical contact mirrors affixed to one of the internal surfaces and the electrically conductive optically transparent layer affixed to the other of the internal surfaces;

a light polarizing layer;

an overmolded housing comprised of an optically clear plastic, defining an optical waveguide in a substantially parallelogram-shaped cross-section, the optical waveguide having a light output surface, and a plurality of mirrored surfaces for directing light from the reflective liquid crystal spatial light modulator stack toward the light output surface, the reflective liquid crystal spatial light modulator stack being positioned within the overmolded housing;

a light source positioned to direct light through the polarizing layer and onto the reflective liquid crystal spatial light modulator stack with the light source spaced from the reflective liquid crystal spatial light modulator stack, so that light from the light source substantially evenly illuminates the reflective liquid crystal spatial light modulator stack, the array of reflective liquid crystal spatial light modulator stack being positioned so that reflected light from the reflective liquid crystal spatial light modulator stack is directed through the polarizing layer and onto the mirrored surface through the optical waveguide;

a diffuser mounted in overlying relationship to the light output surface of the optical waveguide to form an image plane for reflected light from the reflective liquid crystal spatial light modulator stack; and a printed circuit board positioned in a lower aspect of said optical waveguide defined by said overmolded housing, including contacts formed in the circuit board so as to be in electrical contact with the control terminals adjacent an outer edge of the substrate of each control circuit and having a plurality of leads extending to an external portion of the overmolded housing to form external contacts for the control circuits.

20. An integrated electro-optic package for reflective liquid crystal spatial light modulators as claimed in claim 19, wherein the light source is mounted in the mirrored surface of the optical waveguide.

21. A method of fabricating an integrated electro-optic package for reflective spatial light modulators comprising the steps of:

providing a stack including a plurality of reflective spatial light modulators formed in a two dimensional array on a semiconductor substrate with drive electronics formed in the substrate for each spatial light modulator of the array of spatial light modulators and control terminals for the drive electronics positioned adjacent outer edges of the substrate, the stack further including a light transparent surface defining a light input and light output for each of the spatial light modulators in the two dimensional array of reflective spatial light modulators;

forming an overmolded housing, thereby defining an optical waveguide, with the optical waveguide having a light output surface, and a plurality of mirrored surfaces for directing light from the stack toward the light output surface, the stack being mounted within the overmolded housing;

positioning in a lower aspect of said optical waveguide a printed circuit board and having a plurality of contacts each positioned therein so as to provide an internal electrical contact in electrical communication with the control terminals for the drive electronics and a plurality of leads extending to an external surface of the overmolded housing;

positioning the stack in overlying relationship to the printed circuit board, thereby supporting the printed circuit board;

providing a light source to direct light through a polarizing layer, positioned between the light source and the stack;

positioning the light source spaced from the stack, so that light from the light source substantially evenly illuminates the stack, the stack being positioned so that reflected light from the stack is directed onto the mirrored surface through the optical waveguide; and diffusing light reflected from the stack to form an image.

22. A method of fabricating an integrated electro-optic package for reflective spatial light modulators as claimed in claim 21 wherein the step of diffusing includes mounting a diffuser in relationship to the light output surface, thereby directing light through the diffuser to form an image plane for light reflected from the stack, having passed through the polarizing layer and the optical waveguide of the overmolded housing.

23. A method of fabricating an integrated electro-optic package for reflective spatial light modulators as claimed in claim 21 wherein the step of forming an overmolded housing includes molding the housing from plastic.

24. A method of fabricating an integrated electro-optic package for reflective spatial light modulators as claimed in claim 23 wherein the step of molding the overmolded housing from plastic and the step of providing a light source include forming the overmolded housing with an angled light input surface and positioning at least one light emitting diode within the angled light input surface and forming a mirror on the angled surface.

* * * * *